United States Patent [19]

Chang et al.

[11] Patent Number: 5,195,625
[45] Date of Patent: Mar. 23, 1993

[54] TORQUE CUSHION FOR ELECTROMAGNETIC CLUTCH

[75] Inventors: Roy Y. Chang, Wilmette, Ill.; Robert L. Swadner, East Amherst, N.Y.

[73] Assignee: General Motors Corporation, Detroit, Mich.

[21] Appl. No.: 889,898

[22] Filed: May 29, 1992

[51] Int. Cl.$^5$ .................. F16D 27/112; F16D 3/76
[52] U.S. Cl. .................. 192/84 C; 192/106.1; 464/89; 417/319
[58] Field of Search .............. 192/30 V, 84 C, 106.1; 464/87, 89, 903; 417/319

[56] References Cited

U.S. PATENT DOCUMENTS

| | | |
|---|---|---|
| 3,289,487 | 12/1966 | Weedfall . |
| 3,384,213 | 5/1968 | Bernard et al. . |
| 3,548,985 | 12/1970 | Espenschied et al. . |
| 4,296,851 | 10/1981 | Pierce .................. 192/84 C |
| 4,569,426 | 2/1986 | Sekella et al. .................. 192/18 B |
| 4,616,742 | 10/1986 | Matsushita .................. 192/84 C |
| 4,624,354 | 11/1986 | Koitabashi .................. 192/84 C |
| 4,635,774 | 1/1987 | Sekiguchi et al. .................. 192/52 |
| 4,828,090 | 5/1989 | Matsushita .................. 192/84 C |
| 4,972,932 | 11/1990 | Nakamura et al. .................. 192/84 B |

*Primary Examiner*—Richard M. Lorence
*Attorney, Agent, or Firm*—Patrick M. Griffin

[57] ABSTRACT

An electromagnetic clutch assembly adapted for use in actuating a refrigerant compressor having a drive shaft with a continuously driven pulley rotatably supported about the drive shaft. An armature plate is supported in spaced parallel relationship from the pulley friction plate by an elastomeric torque cushion which extends between the drive shaft and the armature plate. The elastomeric torque cushion is capable of flexing to allow the armature plate to bridge the gap under the influence of an electromagnetic force to engage the pulley friction plate thereby translating power from the pulley to the drive shaft. The torque cushion includes at least one reinforcing member disposed within the cushion for preventing the torque cushion from buckling as torque is translated from the pulley through the armature plate and the torque cushion to the drive shaft.

1 Claim, 2 Drawing Sheets

TORQUE CUSHION FOR ELECTROMAGNETIC CLUTCH

BACKGROUND OF THE INVENTION

(1) Technical Field

The subject invention is directed toward an electromagnetic clutch having an elastomeric torque cushion disposed between a drive shaft and an armature plate and includes a cylindrical reinforcing member disposed within the torque cushion for preventing the torque cushion from buckling as the cushion is subjected to torque when the clutch is engaged.

(2) Description of the Prior Art

Electromagnetic clutches are commonly used in conjunction with refrigerant compressors in automotive air conditioning applications to translate torque from the power take-off of the automotive engine to a drive shaft, which, in turn, actuates the compressor. More specifically, when the electromagnetic clutch is energized, a magnetic flux flowing through the armature plate pulls the armature plate across a small gap of predetermined width and against the friction plate of a continuously driven pulley to initiate rotation of the drive shaft. The moment at which the armature plate is engaged causes a significant instantaneous increase in the torsional stress acting on the drive shaft. Extreme and repeated increases in the torsional stress acting on the drive shaft contribute to premature failure.

In order to support the armature plate in parallel spaced relation from the friction plate of the rotating pulley and to allow the armature plate to bridge the gap therebetween to engage the friction plate, the prior art teaches the use of springs which interconnect the armature plate and a support structure which is fixed to the drive shaft. When designed for the specific purpose, certain connecting springs known in the prior art are also employed to absorb and therefore reduce the high torsional stresses generated upon engagement between the armature and friction plates. Examples of electromagnetic clutches including arcuately shaped torsional stress dampening connecting springs can be found at U.S. Pat. No. 4,296,851 issued to Pierce on Oct. 27, 1981 entitled Drive Hub with Curved Springs and Drive Keys For Electromagnetic Clutch; U.S. Pat. No. 4,616,742 issued to Matsushita on Oct. 14, 1986 entitled Spring Coupling For An Electromagnetic Clutch; and U.S. Pat. No. 4,972,932 issued to Nakamura et al. on Nov. 27, 1990 entitled Spring Connected Armature Assembly for Electromagnetic Clutch.

In addition to generating high torsional stresses, the operation of refrigerant compressors in these automotive applications as well as the actuation of the electromagnetic clutch produce vibrations which can result in objectional noise and rapid wear and thus concomitant premature failure of the effected parts. In addition, at certain compressor RPMs, the vibration generated can approach the resonant frequency of the compressor's system resulting in resonance and destructive forces in the system.

In view of the above, it is an important design objective to prevent the frequency of the vibration generated at all operating compressor RPMs from approaching the resonant frequency of the air conditioning compressor system. To overcome this problem, and at the same time deal with torsional stresses generated by the actuation of the electromagnetic clutch, the prior art teaches the use of an elastomeric, e.g. rubber, torque cushion disposed between and interconnecting the drive shaft and the armature plate. The torque cushion absorbs torsional stresses upon engagement of the armature plate with the pulley friction plate and protects the drive shaft from frequent loading at extremely high torsional stresses. Examples of electromagnetic clutches employing elastomeric torque cushions can be found at U.S. Pat. No. 3,384,213 issued to Bernard et al. on May 21, 1968 and entitled Electromagnetic Clutch With Carbon Core; U.S. Pat. No. 4,624,354 issued to Koitabashi on Nov. 25, 1986 and entitled Electromagnetic clutch; and U.S. Pat. No. 4,828,090 issued to Matsushita on May 9, 1989 and entitled Electromagnetic Clutch.

Despite these advancements in the art, problems still remain. It has been found that special care must be taken to design the elastomeric torque cushion such that the natural frequency of the compressor/clutch system can only be approached at RPMs below the operating RPM of the system. This is achieved by decreasing the torsional stiffness of the torque cushion which essentially makes the cushion "softer" and also lowers the peak to peak torque response of the system.

On the other hand, the maximum torsional shear stress on the torque cushion must be kept below allowable limits. However, where torsional stiffness is too low, the torque cushion can buckle under the stress generated during the operation of the compressor which ultimately will lead to a failure oft he cushion. Attempts to strengthen the torque cushion in response to stress and vibration include the addition of flat radially extending spring-like rings imbedded in the torque cushion as shown for example at 135 in FIG. 1 of the Bernard '213 patent. Unfortunately, such rings in the prior art have not adequately addressed the problem of buckling. Furthermore, the flat, annular, radially extending springs of the prior art inhibit axial movement of the cushion which is necessary when the armature plate is drawn across the gap to engage the pulley friction plate. After numerous cycles, these flat springs can become plastically deformed which can skew the parallelly mounted armature plate so as to unacceptably bridge the gap between it and the pulley friction plate and/or cause uneven wear.

The subject invention overcomes these problems in an electromagnetic clutch having a torque cushion with a relatively low torsional stiffness such that the natural frequency of the compressor system is below the operating RPMs of the system but which can withstand the maximum sheer stress generated by the system without buckling. Furthermore, the torque cushion employed by the clutch of the subject invention is specifically adapted to maintain the armature plate in a spaced parallel orientation with respect to the pulley friction plate throughout the life of the clutch.

SUMMARY OF THE INVENTION AND ADVANTAGES

The subject invention is directed toward an electromagnetic clutch assembly adapted for use in actuating a fluid pumping means. The clutch assembly comprises a drive shaft rotatably supported about a central axis and operatively connected to the fluid pumping means to actuate the fluid pumping means. A rotor means including a friction plate is rotatably supported about the drive shaft and operatively coupled to and continuously driven by a power source for providing power input to the drive shaft. An armature assembly having an armature plate is supported in spaced parallel relationship from the rotating friction plate so as to present a gap of predetermined width therebetween. The assembly further includes means for providing an electromagnetic force acting through the rotating friction plate and the armature plate to draw these plates together. An elastomeric member is disposed between and interconnects the drive shaft and the armature plate. The elastomeric member is capable of flexing axially to allow the armature plate to bridge the gap under the influence of the force generated by the means for providing an electromagnetic force to engage the friction plate thereby translating power from the rotor means to the drive shaft. The assembly further includes at least one reinforcing member disposed within the elastomeric member. The reinforcing member includes a reinforcing ring. The ring is substantially cylindrical, in shape axially, extending, and circular in cross section and is disposed concentrically about the shaft. It has side walls which are disposed substantially parallel to the shaft. In this way the reinforcing ring prevents the elastomeric member from buckling radially as the armature assembly is subjected to torque from the engagement of the armature plate and the rotating friction plate. Furthermore, the elastomeric member includes an armature plate orientating means for maintaining the armature plate in spaced parallel relationship across the predetermined air gap from the friction plate and perpendicular to the drive shaft throughout the clutch life.

The electromagnetic clutch of the subject invention employs a torque cushion with a relatively low torsional stiffness such that the natural frequency of the compressor system is below the operating RPM of the system but which can withstand the maximum sheer stress generated by the system without buckling. Furthermore, the torque cushion employed by the clutch of the subject invention is specifically adapted to maintain the armature plate in a spaced parallel orientation with respect to the pulley friction plate throughout the life of the clutch.

BRIEF DESCRIPTION OF THE DRAWINGS

Other advantages of the present invention will be readily appreciated as the same becomes better understood by reference to the following description when considered in connection with the accompanying drawings wherein.

DETAILED DESCRIPTION OF THE BEST MODE FOR CARRYING OUT THE INVENTION

Figure 1:
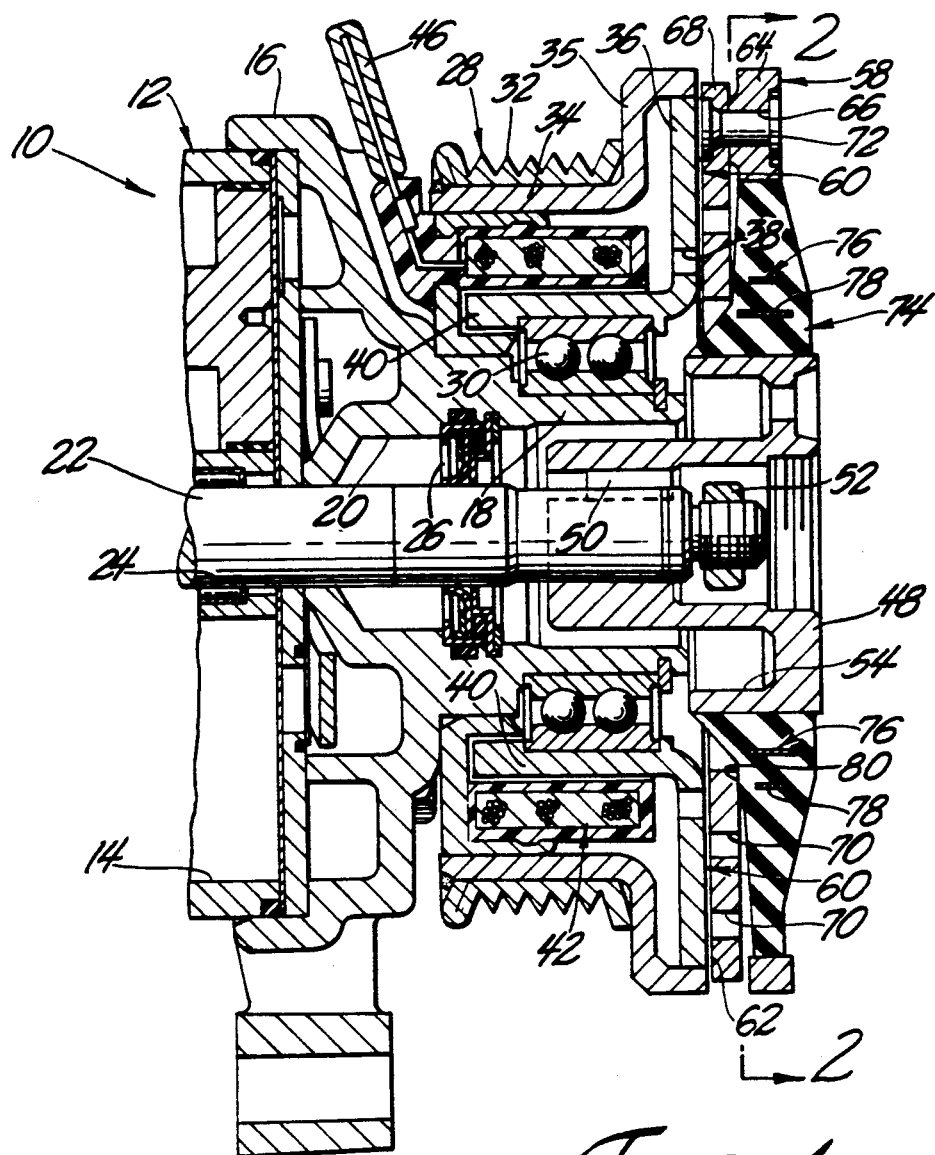
FIG. 1 is a cross-sectional side view of the electromagnetic clutch of the subject invention.

An electromagnetic clutch assembly according to the subject invention is generally shown at 10 in FIG. 1. The clutch 10 is adapted to be used for actuating a fluid pumping means such as an air conditioning compressor, generally indicated at 12. More specifically and in the preferred embodiment, the compressor 12 is of the type for compressing a recirculated refrigerant fluid in an automotive air conditioning system.

The compressor 12 includes a housing 14 to which a front head 16 is fixedly mounted. The front head 16 includes a stepped tubular extension 18 which forms a central passage 20. A drive shaft 22 is rotatably supported about a central axis and within the central passage 20 with the aid of bearings shown, for example, at 24 within the housing 14 adjacent the front head 16. A sealing member 26 is also disposed within the passage 20 and about the drive shaft 22 to seal the interior of the head 16 and housing 14 from the atmosphere. The drive shaft 22 is operatively connected to the compressor 12 to cause the compressor 12 to pump gaseous refrigerant when the drive shaft 22 is powered. To this end, the electromagnetic clutch 10 is employed to selectively translate torque from a power source to the compressor 12 through the drive shaft 22 as will be discussed in greater detail below.

The electromagnetic clutch assembly 10 includes a rotor means, generally indicated at 28, rotatably supported about the drive shaft 22 via bearings 30 which are fixedly mounted on the outer periphery of the tubular extension 18. The rotor means 28 is operatively coupled to and continuously driven by a power source such as an automotive engine for selectively providing power input to the drive shaft 22.

As is commonly known in the art, the rotor means 28 includes an annular pulley 32 adapted to frictionally and operatively engage an endless driving belt driven by the power take-off from the automotive engine. The pulley 3 is connected to an annular flange 34 having a flared portion 35 which terminates at an annular friction plate 36. The annular friction plate 36 is disposed in a plane perpendicular to the drive shaft 22 and includes a plurality of arcuate slots 38 disposed therein in typical fashion. Extending perpendicularly rearward from the friction plate 36 and spaced radially inward from the pulley 32 is provided an inner support ring 40. The support ring 40 and pulley 32 are spaced radially from one another to form an annular pocket therebetween. As alluded to above, the support ring 40 of the rotor means 28 is rotatably supported by the bearing 30. In this way, the rotor means 28 and therefore the pulley 32 are supported for rotation independent of the drive shaft 22 about the central axis.

The assembly 10 further includes means, generally indicated at 42, for selectively providing an electromagnetic force acting through the rotating friction plate 36 and an armature plate 60 to draw these plates into frictional engagement as will be discussed in greater detail below. More specifically, the means 42 for selectively providing an electromagnetic force in the preferred embodiment is a solenoid, also known as a field assembly, which is fixedly supported on the front head 16 and stationarily disposed within the annular pocket formed between the rotating pulley 32 and the rotating support ring 40. The magnetic force generated by the solenoid 42 flows in a circulating path through the annular flange 34, flared portion 35 and friction plate 36 of the rotor means 28 and also through the armature plate 60 and inner support ring 40. An electrical terminal 46 extends from the solenoid 42 to supply the necessary electrical current to create the field of magnetic flux and thus the electromagnetic force.

Figure 2:
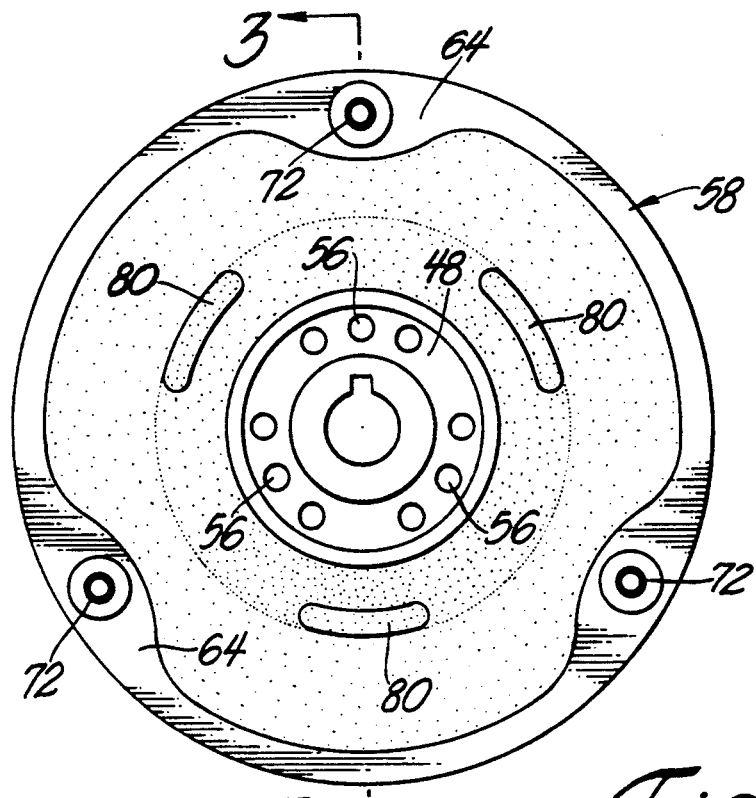
FIG. 2 is a front view of the hub, torque cushion and outer support member as taken substantially along line 2—2 of FIG. 1.

A generally annular hub 48 is fixedly secured to the forward end of the drive shaft 22 and disposed concentrically thereabout by means of a key 50 disposed in corresponding and aligned key ways of the drive shaft 22 and hub 48, and also secured by a nut 52 threadably disposed on the forward distal end of the drive shaft 22. The hub 48 is shown in detail in FIGS. 2–3 including an annular groove 54 disposed on the rearward side thereof. Nine holes 56 extend axially through the hub 48 and intersect the annular groove 54. The holes 56 are arranged in groups of three spaced 120° on center from one another, as shown in FIG. 2. Preferably, the hub 48 is formed from powdered metal using conventional sintering techniques.

The clutch of the subject invention further includes an armature assembly having an outer support member 58 located spaced from the hub 48 and an armature plate 60 supported by the outer support member 58 in spaced parallel relationship from the rotating pulley friction plate 36 so as to present a gap 62 of predetermined width therebetween. A typical gap between the armature and friction plate is somewhere between 0.015 inches and 0.040 inches.

The generally annular outer support member 58 is disposed concentrically about the drive shaft 22. Like the hub 48, the outer support member 58 may be fabricated from powdered metal using a conventional sintering technique. The outer support member 58 includes three equally spaced enlargements 64 having axially extending passages 66 disposed through each.

The armature plate 60 is provided with a plurality of arcuate slots 70 strategically positioned relative to the arcuate slots 38 in the friction plate 36 to force the magnetic flux path between the armature plate 60 and the friction plate 36 around the respective arcuate slots 38, 70 to draw the armature plate 60 into frictional engagement with the friction plate 36.

The armature plate 60 has an outer diameter defining an outer radial edge 68 and is supported by the outer support member 58 at its outer radial edge 68. More specifically, the aemature plate 60 is fixedly secured to the outer support member 58 by way of rivets 72 disposed through the passages 66 in the enlargements 64 of the support member 58. Therefore, the armature plate 60 and the support member 58 are fixedly and rigidly secured to one another.

An elastomeric member, generally indicated at 74, is disposed between and interconnects the hub 48 mounted on the drive shaft 22 and the outer support member 58 to which the armature plate 60 is mounted. The elastomeric member is an annular torque cushion 74 which is capable of flexing to allow the armature plate to bridge the gap 62 under the influence of the electromagnetic force generated by the solenoid 42 to engage the friction plate 36 thereby translating power from the power source, through the continuously driven pulley 32 to the drive shaft 22 and thus the compressor 12. The annular disk-like torque cushion 74 is preferably manufactured from a rubber compound, such as Neoprene, Butal, or Vamac. The torque cushion 74 is bonded to the hub 48 using conventional rubber to metal bonding techniques. The outer support member 58 is bonded to the periphery of the torque cushion 74 in a similarly conventional manner.

The rubber torque cushion 74 includes a plurality of annular metallic reinforcing rings, generally indicated at 76, disposed within the torque cushion 74. The axially extending rings 76 are substantially cylindrical in shape and circular in cross-section and disposed concentrically relative to one another and about the hub 48 and between the hub 48 and the outer support member 58. Further, the cylindrical reinforcing rings 76 include sidewalls 78 which are disposed substantially parallel to the hub 48. The reinforcing rings 76 are made from steel and are molded into the rubber torque cushion 76. In this way, the cylindrical, reinforcing rings 76 prevent the torque cushion 74 from buckling radially as the armature assembly is subjected to torque from the engagement of the armature plate 60 and the rotating friction plate 36. At the same time, because of the structure and position of the cylindrically shaped reinforcing rings 76, the axial movement of the torque cushion under the influence of the electromagnetic force is not inhibited. Furthermore, the reinforcing rings 76 of the subject invention are not prone to plastic deformation nor failure due to cyclical stress. As such, the electromagnetic clutch of the subject invention employs a torque cushion having a relatively low torsional stiffness such that the resonant frequency of the torque cushion and the compressor system is below the frequencies generated at any operating RPM of the compressor system.

The torque cushion 74 may have a predetermined thickness at the interface of the torque cushion 74 and the hub 48 and have a second smaller predetermined thickness at the interface of the torque cushion 74 and the outer support member 58 such that the thickness of the torque cushion 74 tapers as the radius of the torque cushion increases. In this way, the stresses in the torque cushion are unified and the resonant frequency of the torque cushion is reduced. A more detailed discussion of the effect of the specific shape of the torque cushion on the resonant frequency of the compressor/clutch system is included in U.S. Pat. application Ser. No. 07/889,877 entitled Torsional Damper For Air Conditioning Compressor, by the same inventor as the subject invention and filed on the same day as the subject application and assigned to the same assignee of this invention. As such, the disclosure of that application is incorporated herein by reference.

Figure 4:
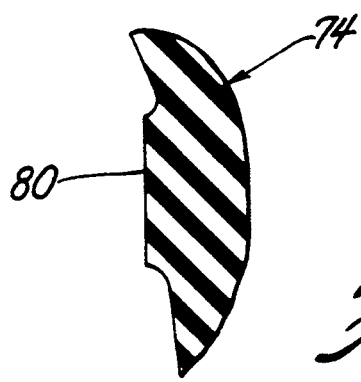
FIG. 4 is a partially broken away side view of the orientating means of the torque cushion as shown in FIG. 3.
Figure 3:
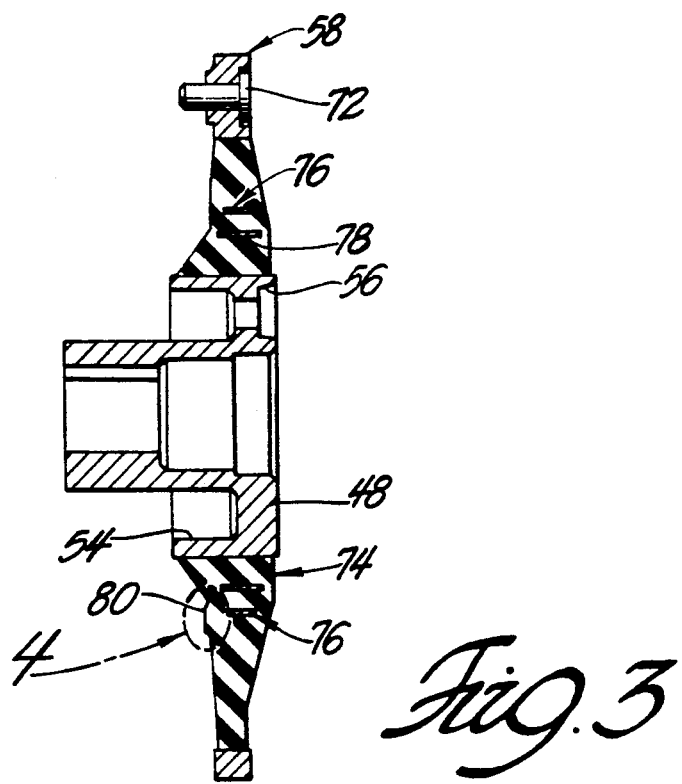
FIG. 3 is a cross-sectional view as taken substantially along lines 3—3 of FIG. 2.

Referring now to FIGS. 1, 3 and 4, the torque cushion 74 of the subject invention includes armature plate orientating means 80 for maintaining the armature plate 60 in spaced parallel relationship across the predetermined air gap 62 from the friction plate 58 and perpendicular to the drive shaft 22. More specifically, the armature plate orientating means includes a plurality of arcuate, planar locating surfaces 80 disposed in spaced radial increments relative to one another on the inward side of the torque cushion 74 and facing toward the gap 62. In the preferred embodiment of the subject invention, there are three locating surfaces 80 disposed at 120° radial increments on center from one another. The locating surfaces 80 are integral with the elastomeric member 74 and remote from the outer support member 58. When mounted to the outer support member 58, the side of the armature plate opposite the pulley friction plate is in abutting contact with the planar locating surfaces 80 so as to compress these surfaces. In addition to maintaining the armature plate 60 in spaced parallel relation to the friction plate 36, the preloaded surfaces 80 act to push the armature plate 60 away from the friction plate 36 so that the plates disengage once the electromagnetic force has been terminated. In this way, a skewing of the position of the armature plate 60 across the gap 62 is prevented.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An electromagnetic clutch assembly adapted for use in actuating a fluid pumping means, said assembly comprising;

a drive shaft rotatably supported about a central axis and for operatively connecting to the fluid pumping means to actuate the fluid pumping means;

a rotor means including a friction plate rotatably supported about said drive shaft and operatively coupled to and continuously driven by a power source for providing power input to said drive shaft;

an armature assembly having an armature plate supported in spaced parallel relationship from said rotating friction plate so as to present a gap of predetermined width therebetween;

means for providing an electromagnetic force acting through said rotating friction plate and said armature plate;

an elastomeric member disposed between and interconnecting said drive shaft and said armature plate, said elastomeric member capable of flexing axially to allow said armature plate to bridge said gap under the influence of the force generated by said means for providing an electromagnetic force to engage said friction plate thereby translating power from said rotor means to said drive shaft; and at least one reinforcing member disposed within said elastomeric member, said assembly characterized by said reinforcing member including a cylindrical, axially extending ring, said ring being disposed concentrically about said shaft and having side walls which are disposed substantially parallel to said shaft for preventing said elastomeric member from buckling radially as said armature assembly is subjected to torque from the engagement of said armature plate and said rotating friction plate while substantially maintaining the axial flexibility of said elastomeric member.

* * * * *